(12) United States Patent
Mikhailov

(10) Patent No.: US 7,085,053 B2
(45) Date of Patent: Aug. 1, 2006

(54) BEAM SHAPING DEVICE, SYSTEM FOR LAUNCHING A LIGHT BEAM INTO AN OPTICAL FIBER, AND BEAM ROTATION UNIT FOR SUCH A BEAM SHAPING DEVICE OR SUCH A SYSTEM

(75) Inventor: Alexei Mikhailov, Dortmund (DE)

(73) Assignee: Hentze-Lissotschenko Patentverwaltungs GmbH & Co. KG, Norderfriedrichskoog (DE)

( * ) Notice: Subject to any disclaimer, the term of this patent is extended or adjusted under 35 U.S.C. 154(b) by 0 days.

(21) Appl. No.: 10/469,991

(22) PCT Filed: Mar. 15, 2002

(86) PCT No.: PCT/EP02/02920

§ 371 (c)(1),
(2), (4) Date: Sep. 16, 2003

(87) PCT Pub. No.: WO02/075432

PCT Pub. Date: Sep. 26, 2002

(65) Prior Publication Data

US 2004/0091209 A1    May 13, 2004

(30) Foreign Application Priority Data

Mar. 17, 2001   (DE) ................... 101 13 019

(51) Int. Cl.
    *G02B 5/30* (2006.01)
(52) U.S. Cl. ................. 359/497; 359/834; 359/629

(58) Field of Classification Search ............... 359/487, 359/485, 494, 495, 496, 497, 629, 636, 638, 359/639, 640, 896, 831, 833, 834, 835, 836; 385/31, 36; 362/259
See application file for complete search history.

(56) References Cited

U.S. PATENT DOCUMENTS

| | | | | |
|---|---|---|---|---|
| 4,929,067 A | * | 5/1990 | Sander | 359/669 |
| 5,513,201 A | | 4/1996 | Yamaguchi et al. | 372/75 |
| 5,808,323 A | | 9/1998 | Spaeth et al. | 257/88 |
| 6,377,599 B1 | * | 4/2002 | Marshall | 372/75 |
| 6,407,870 B1 | * | 6/2002 | Hurevich et al. | 359/668 |

FOREIGN PATENT DOCUMENTS

| | | |
|---|---|---|
| DE | 195 37 265 C1 | 2/1997 |
| EP | 0 298 490 | 1/1989 |
| EP | 0 961 152 | 12/1999 |
| GB | 2 182 168 A | 5/1987 |
| WO | WO 98/08128 | 2/1998 |
| WO | WO 00/57229 | 9/2000 |

* cited by examiner

*Primary Examiner*—Arnel C. Lavarias
(74) *Attorney, Agent, or Firm*—Hoffman, Wasson & Gitler

(57) ABSTRACT

A device for shaping the cross-section of a light beam, has at least one beam shaping unit with a beam splitter, beam deflector and beam combiner. The beam splitter can split a light beam which is incident on the beam shaping unit into two partial beams. The beam deflector can deflect at least one of the partial beams onto the beam combiner which can combine the two partial beams in such a manner that the cross-section of the light beam emerging from the beam shaping unit is reduced in size in one direction compared to the light beam incident on the beam shaping unit. The beam combiner is a polarisation-selective beam splitting and beam combination unit that comprises at least two elements with an interface interposed in between. The two split partial beams can be incident on the interface from different directions.

15 Claims, 3 Drawing Sheets

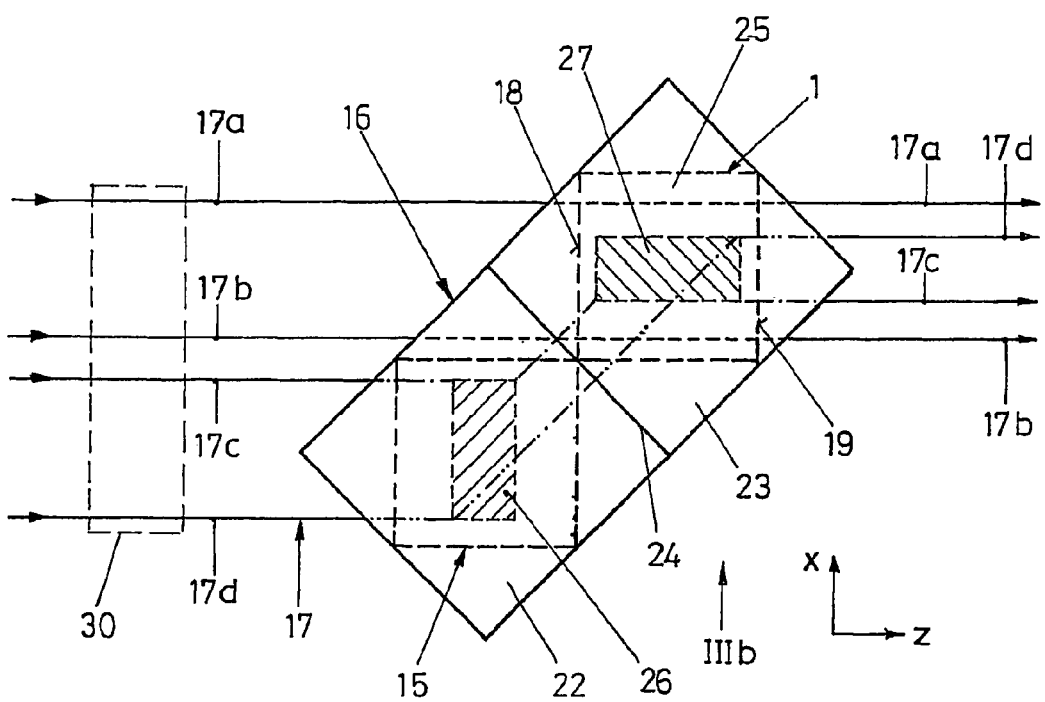
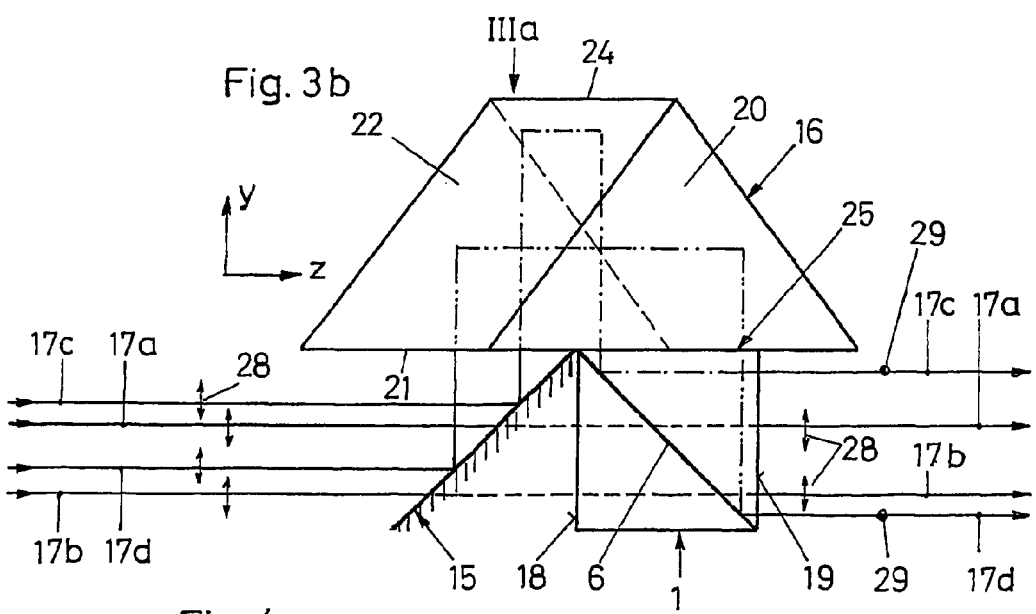
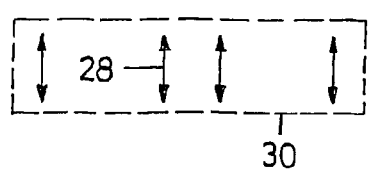
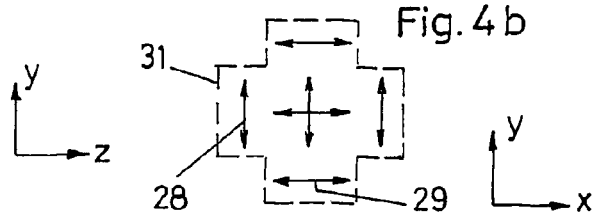

BEAM SHAPING DEVICE, SYSTEM FOR LAUNCHING A LIGHT BEAM INTO AN OPTICAL FIBER, AND BEAM ROTATION UNIT FOR SUCH A BEAM SHAPING DEVICE OR SUCH A SYSTEM

BACKGROUND OF THE INVENTION

This invention relates to a device for shaping the cross section of a light beam, including at least one beam shaping unit, with beam splitter means, beam deflection means and beam combining means, the beam splitter means being able to divide a light beam which is incident on the beam shaping unit into two component beams, the beam deflection means being able to deflect at least one of the component beams onto the beam combining means, and the beam combining means being able to combine the two component beams, such that the cross section of the light beam emerging from the beam shaping unit compared to the light beam entering the beam shaping unit is reduced in at least one direction.

Furthermore this invention relates to an arrangement for coupling a light beam which proceeds from an elongated laser light source with an elongated cross section into an optical fiber, comprising a laser light source, at least one collimation unit for collimating the light beam which emerges from the laser light source, and at least one focusing unit for focusing the light beams onto an optical fiber.

Furthermore the invention relates to a beam rotation unit for one such device, the beam rotation unit comprising at least one prism which can be located in the beam path of at least one light beam such that the cross section of the light beam passing through at least one prism can be turned by at least two reflections, especially rotation by 90° being able to take place.

A device of the aforementioned type and an arrangement of the aforementioned type are disclosed by German patent DE 195 37 265 C1. In the embodiment of a beam shaping unit which is described in it a rhomboid prism pair which separates the incident radiation into two component beam pencils is used as the beam splitter means. The beam deflection means is two half cubic prisms which are integrated into the corresponding component beam paths, as a result of the relatively long path of the component beam pencil which has been traversed in this beam shaping unit there being another lens located between the rhomboid prism pair and the half cubic prisms. The beam combining means is a fifth prism which deflects the component beam pencils, which are incident on it, and combines them again.

The disadvantage in such a beam shaping unit is that a total of seven components are used, each of the individual component beams passing through either optionally partially absorbing surfaces of optical components and each being reflected on two other surfaces of the aforementioned components which may not be 100% reflective. As a result of the many surfaces which must be transmitting or on which there must be reflection, a relatively high cost must be borne to improve these surfaces accordingly with regard to transmission and reflection. In particular, when several of these beam shaping units are set up in succession, such a beam shaping device will be less effective. Furthermore, as a result of the many components, which are used, and the high improvement cost these beam shaping units will be extremely expensive.

An arrangement of the initially mentioned type is generally used when for example the laser radiation emerging from a laser diode bar is to be focused on an optical fiber. In particular, as a result of the almost line-shaped laser light source with individual emission centers which are located spaced apart over the length of the line and the different divergences in the slow axis direction and fast axis direction, it is a good idea to use a beam shaping device of the initially mentioned type in order to repeatedly shape or fold together the laser light emerging from the laser diode bar with an almost line-shaped cross section so that a laser beam pencil with an almost square cross section is formed which can then be more easily focused on an optical fiber. The effectiveness and economic efficiency of this arrangement arises of course from the effectiveness and economic efficiency of the beam shaping unit used in it.

A beam rotation unit of the initially mentioned type is known from U.S. Pat. No. 5,513,201. By means of the beam rotation units described in it the laser radiation emerging from the laser diode bars will be focused on an optical fiber. In the already described divergences in the slow axis and the fast axis direction of the laser light emerging from the laser diode bars rotation of the individual light beams is a good idea because in this way the divergences in the slow axis direction and the fast axis direction can be interchanged. The beam rotation units described in the aforementioned US patent use prisms for beam rotation. These prisms are however extremely complex in structure and can only be produced with a very high fabrication cost.

The object of this invention is to devise a beam shaping device of the initially mentioned type, a beam rotation unit and an arrangement of the initially mentioned type with an effective and economical structure.

SUMMARY OF THE INVENTION

The beam combining means is made as a polarization-selective beam splitter and beam combination unit which includes at least two parts with a boundary surface which is located between them, and the two separated component beams can be incident on the boundary surface from different directions, and depending on their linear polarization one of the component beams can pass the boundary surface unhindered and the other of the component beams can be reflected on the boundary surface so that the two component beams are combined in the area of the boundary surface and leave the beam splitter and beam combination unit essentially at the same location in the same direction. This polarization-selective beam splitter and beam combination unit make available a beam shaping unit in which one of the beams passes through the aforementioned boundary surface essentially without reflection, conversely the other of the beams is completely reflected on the boundary surface so that losses hardly occur. Especially the beam splitter and beam combination unit can be located in the beam path of the light beam which is incident on it such that it is used both as a beam splitter means and also a beam combination means in which the first component beam is incident directly on the first entry surface of the beam splitter and beam combination unit, conversely the second component beam can run past the first entry surface and can be deflected by the beam deflection means onto the second entry surface. In this way the number of reflections and transmissions is further reduced.

A beam splitter and beam combination unit as claimed in the invention can be made at least in sections of a double-refracting material and can be made for example as a Glan-Thompson prism.

Alternatively the beam splitter and beam combination unit can be made as a so-called polarization cube, the polarization cube consisting of two essentially identical prism-like parts which form a boundary surface along one diagonal surface of the cube with one another. At least one of the two prism-like parts can be provided with a polarization-selective coating in the area of the boundary surface. As a result of this coating these polarization cubes can be made such that at a certain angle the light beams of a first linear polarization direction, which are incident on the boundary surface, are completely reflected, conversely light beams of a second direction which is perpendicular to the first linear polarization direction pass through the boundary surface. If the two component beams are incident on the polarization cube from different directions which include an angle of 90° with one another, and the boundary surface is oriented such that the bisector of the angle between the incidence directions of the two component beams lies in the plane of the boundary surface, the component beams can be joined as a result of the above described polarization-selective reflection or transmission on the boundary surface and leave the beam splitter and beam combination unit essentially at the same location in the same direction.

According to one preferred embodiment of this invention, the beam shaping unit is made from a polarization rotation element which can rotate the linear polarization of one of the two component beams, especially by an angle of 90°. In this way it is ensured that one of the two component beams is reflected on the boundary surface, conversely the other of the two component beams is transmitted. Here it is assumed that the incident light beam, which is to be split into two component beams, is essentially linearly polarized, as is generally the case in laser beams. For the case in which the incident light beam is not linearly polarized or is so only to a small degree, a linear polarizer should be connected upstream in order to ensure the combination of the components beams as claimed in the invention in the beam splitter and beam combination unit.

The polarization rotation element can be made as a half wavelength plate. This is a simple and proven embodiment of the polarization rotation element.

Alternatively the polarization rotation element can be made as a prism, which is arranged such that the cross section of the corresponding component beam is turned during passage through the prism, especially by 90°, in this way the corresponding rotation of the linear polarization of this component beam taking place. A prism arranged in this way represents a very elegant embodiment of a polarization rotation element because the prism can perform still other functions. There is for example the possibility that the prism is used at the same time as the beam deflection means, then in the prism the corresponding component beam being able to be reflected, especially reflected twice. In this way the number of transmissions and reflections is likewise reduced.

The beam deflection means can furthermore or alternatively be made of a mirror, which can be located preferably at an angle of 45° in the second of the two component beams. In particular it can be provided that the prism, the mirror and the beam splitter and beam combination unit are arranged such that a component beam can be directly incident on the first entry surface of the beam splitter and beam combination unit, conversely the second component beam is reflected by the mirror into the prism, in which the beam cross section of the component beam is turned by 90° and from which the component beam can enter the second entry surface of the beam splitter and beam combination unit. In this way the number of reflections and transmissions for the two component beams is minimized, at the same time very elegant beam deflection and polarization rotation being achieved by the prism.

According to one preferred embodiment of this invention, the device includes more than one beam shaping unit which are located in succession such that the cross section of the light beam changes in each of the beam shaping units, especially can be reduced in one direction. In this way especially a laser beam emerging from a laser diode bar can be repeatedly reduced in one direction such that the arrangement as claimed in the invention for coupling into the optical fiber can be optimized.

According to another preferred embodiment of this invention, the device include more than one beam shaping unit which are located next to one another such that light beams emerging from the light sources which are next to one another can be changed in the beam shaping units located next to one another, in particular can be made smaller in one direction. In this way for example in an arrangement as claimed in claim 17 the light beams emerging from the individual emission centers of a laser diode bar can be changed at the same time in the beam shaping units which are located next to one another with respect to their beam cross section.

In doing so the beam shaping units located next to one another can comprise an array of prisms, each of the individual prisms of the array being used at the same time as a polarization rotation element and as a deflection means of each of the individual beam shaping units. By combining the individual prisms into an array, an embodiment of the beam shaping units which are located next to one another, which embodiment can be economically produced, is devised. Moreover such an array can be more easily managed because the distances of the individual prisms to one another and the orientation of the individual prisms to one another can be dictated by the production process. Optionally there is the possibility of integrating the other elements of the beam shaping unit into the array or mounting it securely on the array at the factory.

It is quite possible to arrange several arrays or several beam shaping units formed by these arrays in succession in order to change the cross section of the individual light beams successively in the units which are located behind one another.

In a beam rotation unit, it is provided that at least one prism has two base surfaces which are made as isosceles right triangles and three rectangular prism surfaces, and the light beam passing through at least one prism can be reflected on the two prism surfaces which extend between the legs of the base surfaces. The structure of the prism as such an isosceles right-angle prism constituted a very simple and economically producible choice.

In particular, it is possible for the beam rotation unit to include a number of prisms, which are combined into an array so that the cross sections of the light beams proceeding from the light sources which are located next to one another can be rotated. Such an array of prisms can then be integrated for example into an arrangement in order to rotate the light beams emerging from the individual emission centers of the laser diode bar in order to cause exchange of the fast axis divergence with the slow axis divergence. This array of cylinder lenses can be more easily produced in contrast to the beam rotation units, which are known.

BRIEF DESCRIPTION OF THE DRAWINGS

Other features and advantages of this invention become clear from the following description of preferred embodiments with reference to the attached figures:

FIG. 3a shows a top view of another embodiment of a device as claimed in the invention;

FIG. 3b shows a side view of the device as shown in FIG. 3a;

FIG. 4a shows the cross section of a light beam before entering the device as shown in FIG. 3;

FIG. 4b shows a cross section of the light beam as shown in FIG. 4a after passing through the device as shown in FIG. 3;

DETAILED DESCRIPTION OF THE INVENTION

Figure 1:
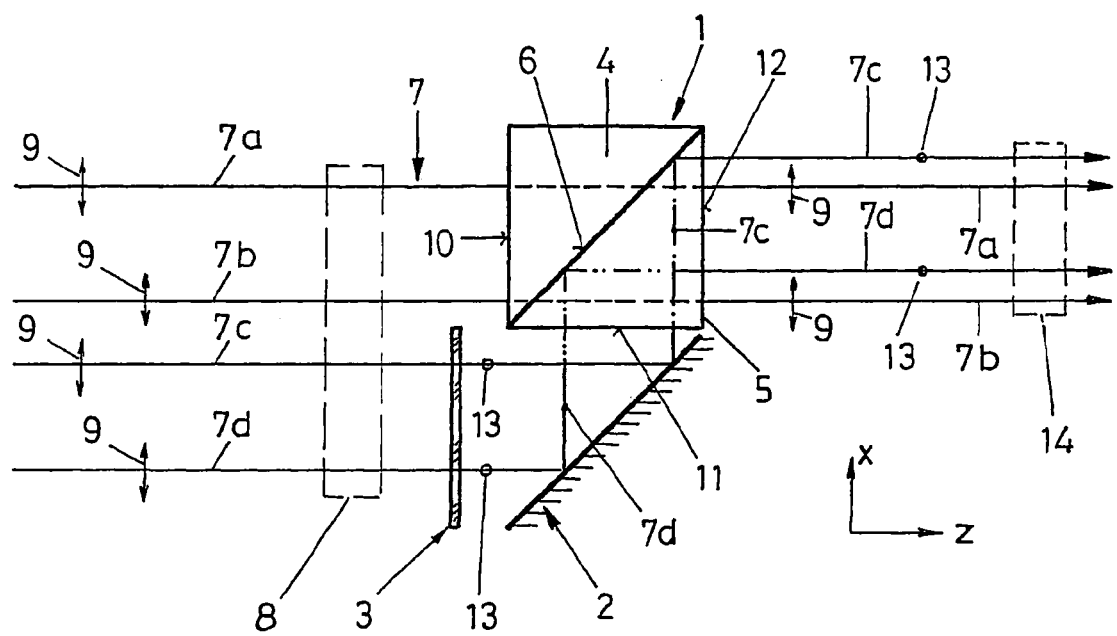
FIG. 1 shows a schematic side view of one embodiment of a device as claimed in the invention.

As is apparent from FIG. 1, the first embodiment of a device as includes a beam shaping unit with a polarization selective beam splitter and beam combination unit 1, a mirror 2 and a polarization rotation element 3. The beam splitter and beam combination unit 1 is made as a polarization cube. This polarization cube generally is made of silica glass or a comparable material and has two prism-shaped halves 4, 5 which are connected to one another along a diagonal boundary surface 6 of the cube, especially cemented to one another. The boundary surface 6 is provided with an especially multilayer polarization-selective coating. As a result of this coating, these polarization cubes can be made such that light beams of a first polarization direction which are incident at a certain angle on the boundary surface 6 are totally reflected, conversely light beams of a second direction which is perpendicular to the first direction pass through the boundary surface. The invention exploits this effect, as will be examined below.

Figure 2A:
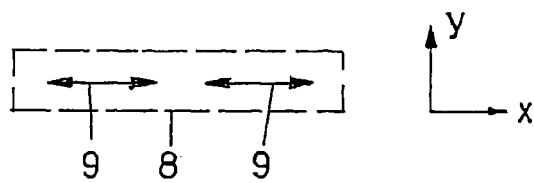
FIG. 2a shows the beam cross section of a light beam before entering the device as shown in FIG. 1.

FIG. 1 shows a light beam 7a, b, c, d running from the left, i.e. in the Z direction, onto a beam shaping unit consisting of a beam splitter and beam combination unit 1, mirror 2 and polarization rotation element 3 comprised by the device as claimed in the invention. The light beam 7a, b, c, d has a cross section 8 which is shown in FIG. 2a. Furthermore it is indicated in FIG. 1 and FIG. 2a that the light beam 7 is linearly polarized in the X direction; this is illustrated by the arrows 9. The illustrated component means 7a, 7b, 7c, 7d of the light beam 7 represent sample component beams.

The beam 7 is thus divided into two component beam pencils 7a, 7b, and 7c, 7d by the first component beam pencil 7a, 7b being incident perpendicularly on the first entry surface 10 of the beam splitter and beam combination unit 1 and passing through it. Conversely the second component beam pencil 7c, 7d runs past the bottom of the beam splitter and beam combination unit 1 and is incident on the mirror 2 which is aligned in FIG. 1 at 45° to the entering component beam pencil 7c, 7d. From this mirror the component beam pencil 7c, 7d is reflected in the X direction or in FIG. 1 to the top and is incident on the second entry surface 11 of the beam splitter and beam combination unit 1 which includes a right angle with the first entry surface 10.

The polarization rotation element 3 which is encompassed by the beam shaping unit is arranged in the embodiment shown in FIG. 1 such that the second component beam pencil 7c, 7d before being incident on the mirror 2 passes through the polarization rotation element 3. Alternatively the polarization rotation element 3 could also be located between the mirror 2 and the second entry surface 11 of the beam splitter and beam combination unit 1. The polarization rotation element 3 rotates the linear polarization of a passing light beam by 90°. The polarization rotation element 3 can be made for example as a half wavelength plate.

Figure 2B:
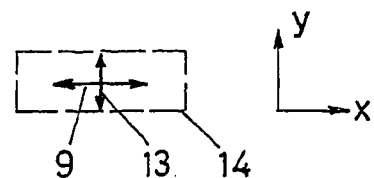
FIG. 2b shows the cross section of the light beam as shown in FIG. 2a after passing through the device as shown in FIG. 1.

As is apparent from FIG. 1, the beam splitter and beam combination unit 1 made as a polarization cube is made and arranged such that the first component beam pencil 7a, 7b entering the first entry surface 10 is incident on the boundary surface 6 at an angle of 45°, passes essentially unhindered through it and leaves the beam splitter and beam combination unit 1 through the exit surface 12 which is opposite the first entry surface 10 essentially in the same direction in which it entered it. Furthermore it is apparent from FIG. 1 that the linear polarization of the component beam pencil 7c, 7d after passing through the polarization rotation element 3 is rotated by 90° and is polarized in the Y direction according to the arrows 13 which point into the plane of the drawings or project out of it. The component beam pencil 7c, 7d which is likewise incident at an angle of 45° on the boundary surface 6 thus compared to the component beam pencil 7a, 7b has a linear polarization direction which has been rotated by 90° so that the component beam pencil 7c, 7d is totally reflected on the boundary surface 6. Therefore the component beam pencil 7a, 7b and 7c, 7d in the area of the boundary surface 6 combine and emerge jointly from the exit surface 12, as is shown schematically in FIG. 1. It becomes clear from FIG. 2b that the cross section 14 of the light beam 7 emerging from the beam shaping unit has been reduced in size by one half in the X direction, conversely the extension of the beam in the Y direction was preserved. This is due to the fact that the component beam pencils 7a, 7b and 7c, 7d after emerging from the beam shaping unit completely overlap; this among others also results in that the beam 7 is unpolarized after emerging from the beam shaping unit. In FIG. 2b the linear polarization directions 9, 13 of the two component beam pencils 7a, 7b which contribute to the cross section 14 are indicated. They are polarized perpendicular to one another so that ultimately an unpolarized light beam 7 emerges from the beam shaping unit or the device.

It is quite possible in a device to arrange several of the beam shaping units shown in FIG. 1 in succession, the cross section of the light beam passing through this beam shaping unit being shaped accordingly, especially cut in half in one direction.

FIG. 3 shows another embodiment of a device as claimed in the invention which comprises a beam shaping unit of somewhat different structure. This beam shaping unit in turn has a beam splitter and beam combination unit 1 which corresponds to the beam splitter and beam combination unit 1 from FIG. 1. Furthermore the beam shaping unit has beam deflection means which comprise a mirror 15 and a prism 16. The prism 16 is arranged such that it is used additionally as a polarization rotation element, as becomes clear from the following description.

FIGS. 3a and 3b show a light beam 17 which is running from the left in the Z direction onto the beam shaping units and which is illustrated by component beams 17a, 17b, 17c and 17d which have been extracted by way of example. The beam splitter and beam combination unit 1 and the mirror 15 are located offset to one another in the X and Y direction so that the mirror 15 borders the edge of the beam splitter and beam combination unit 1 which extends in the Y direction, as is clearly apparent especially from the overhead view in FIG. 3a. In this way the light beam 17 which is running in FIG. 3a from the left onto the beam shaping unit with the component beam pencil 17a, 17b which is the top one in FIG. 3a will run past the mirror 15 and will be incident on the first entry surface 18 which is the X-Y surface in the illustrated coordinate system. This component beam pencil 17a, 17b corresponding to the component beam pencil 7a, 7b in FIG. 1 passes essentially unhindered through the boundary surface 6 and the beam splitter and beam combination unit 1 and leaves it through the opposing exit surface 19.

The component beam pencil 17c, 17d which is the lower one in FIG. 3a is incident in the Z direction in front of the beam splitter and beam combination unit 1 on the mirror 15 which is located at an angle of 45° to the Z direction and is deflected by it to the top in the Y direction, as is apparent from FIG. 3b. Directly above the mirror 15 and the beam splitter and beam combination unit 1 the prism 16 is located on them. The prism 16 in the illustrated embodiment has two base surfaces 20 which are made as isosceles right triangles and three rectangular prism surfaces 21, 22, 23. The prism 16 is thus arranged such that the component beam pencil 17c, 17d which is reflected up by the mirror 15 enters the prism 16 through the prism surface 21 which is formed by the hypotenuses of the base surfaces 20, this prism surface 21 in the illustrated coordinate system being an X, Z surface and resting at least in sections on the top of the beam splitter and beam combination unit 1 which is made as a polarization cube. Furthermore the prism 16 is aligned such that the hypotenuses of the base surfaces 20 with the sides of the upper cube surface of the beam splitter and beam combination unit 1 include an angle of 45°. Furthermore, the prism is aligned such that the projection of the apex line 24 of the prism into the XZ plane exactly intersects the connecting area between the beam splitter and beam combination unit 1 and mirror 15, as is clearly apparent from the overhead view as shown in FIG. 3a.

FIG. 3 furthermore indicates that the component beam pencil 16c, 16d entering the prism 16 from underneath is reflected on the two prism surfaces 22, 23. Optionally these prism surfaces can additionally be mirrored. From the second of these prism surfaces, i.e. from the surface 23, the component beam pencil 17c, 17d is reflected downward and leaves the prism surface 21 which has been formed as the connecting surface between the hypotenuses down in the negative Y direction and enters the beam splitter and beam combination unit 1 through its upper cube surface which is used as the second entry surface 25.

As a result of the above described arrangement of the prism 16 the component beam pencil 17c, 17d in double reflection on the prism surfaces 22, 23 is deflected not only from above into the beam splitter and beam combination unit 1, but also turned by 90° in itself. This rotation by 90° will be indicated by the two cross-hatched surfaces 26, 27 which are shown in FIG. 3a. These cross-hatched areas 26, 27 roughly reproduce the cross section of the component beam pencil which extends between the beams 17c and 17d after reflection in the Y direction or the −Y direction. As is apparent from FIG. 3a, the two cross-hatched areas 26, 27 are turned by an angle of 90° to one another.

FIG. 3b likewise shows the direction of the linear polarization of the light beams 17 in the Y-direction by means of arrows 28. As is likewise indicated on the right side in FIG. 3b, the component beam pencil 17c, 17d also undergoes rotation of the polarization direction by the 90° rotation in the prism 16 so that the component beam pencil 17c, 17d after passing through the prism 16 in the X direction is linearly polarized, as is indicated by the arrows 29. As a result of the linear polarization of the component beam pencil 17c, 17d which is perpendicular to the polarization of the component beam pencil 17a, 17b it is reflected on the boundary surface 6 and leaves the beam splitter and beam combination unit 1 from the same exit surface 19 from which the component beam pencil 17a, 17b emerges.

FIG. 4a shows the cross section 30 of the light beam 17 entering the beam shaping unit. After passing through the beam shaping unit the light beam 17 has the cross section which is shown in FIG. 4b and which represents overlapping of the cross section 31 of the component beam pencil 17a, 17b which extends essentially in the X direction and of the cross section of the component beam pencil 17c, 17d which extends essentially in the Y direction. Therefore the cross section 31 is essentially cross-shaped. The arrows 28, 29 indicate that the light beam 17 leaving the beam shaping unit is likewise unpolarized at least in sections. FIG. 4b moreover clearly shows that the component beam pencil 17c, 17d has been turned with respect to its cross section by 90° as it passes through the prism 16.

It is also quite possible to place several of the beam shaping units shown in FIG. 3 in succession so that the light beams passing through this device experience a corresponding change in cross section in each of the beam shaping units. Furthermore, it is also possible in a device as claimed in the invention to place the beam shaping units of the type shown in FIG. 1 with beam shaping units of the type shown in FIG. 3 in succession.

Furthermore, there is the possibility of using units with similar action as the beam splitter and beam combination unit 1 instead of the polarization cube shown in FIG. 1 and FIG. 3. For example, a Glan-Thompson prism could be used. What is important is the fact that this beam splitter and beam combination unit consists of two parts, between which there is a boundary surface. Furthermore the boundary surface must reflect in a linear polarization-selective manner at a given angle the light beams incident on it by means of a certain wavelength or allow them to pass essentially unhindered. In order to achieve this action, as already described, double-refracting materials are suited which with respect to their optical axis or their optical axes are aligned such that polarized beams on a boundary surface formed for example by putty are reflected or passed essentially unhindered according to their polarization.

Furthermore, as claimed in the invention it is possible to arrange several beam shaping units next to one another. In this way the light beams emerging from the light sources located next to one another can be shaped at the same time upon passage through the beam shaping units which are next to one another. One example of these light sources which are next to one another is a laser diode bar which generally has line-shaped emission sources of laser light which are located at equal distances next to one another.

Figure 5:
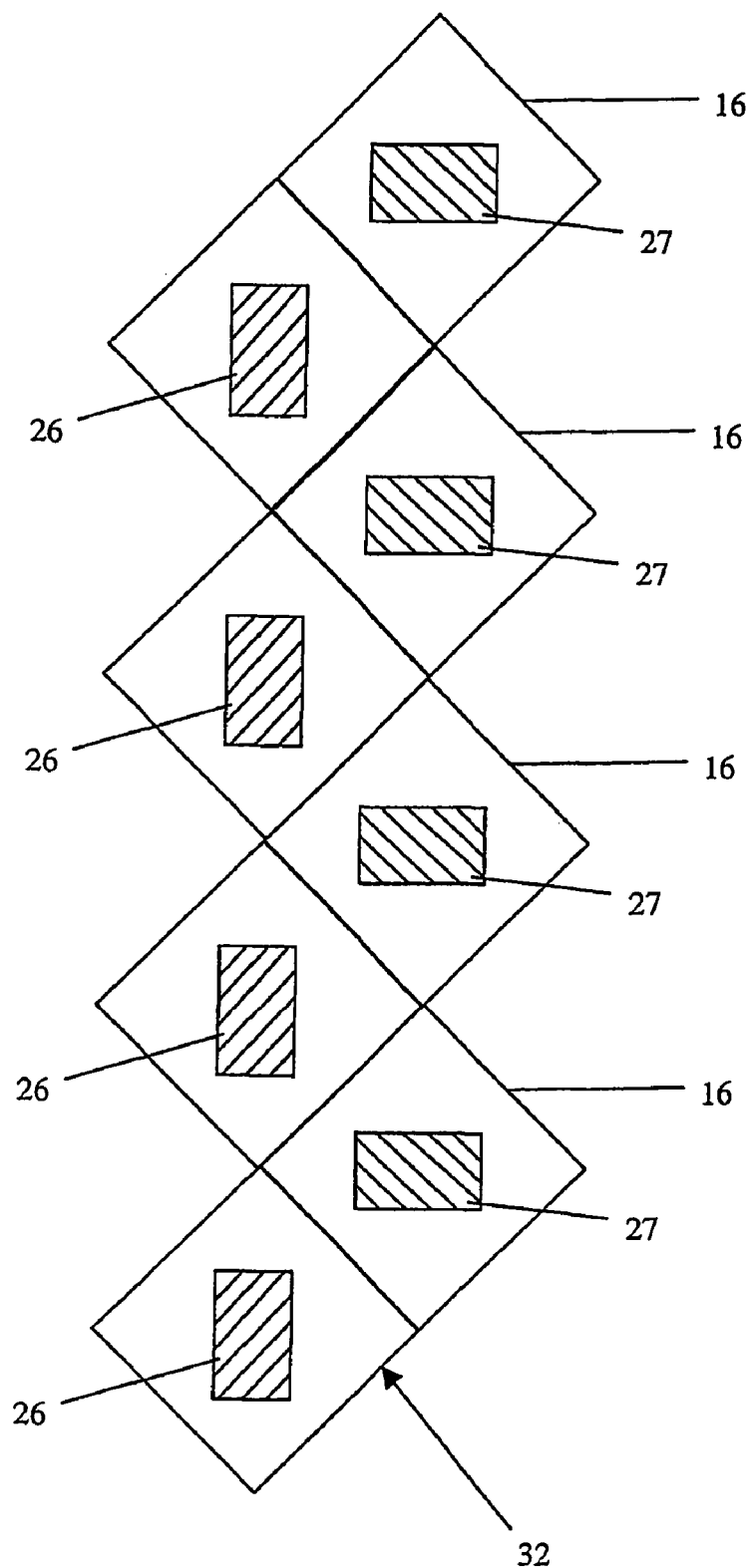
FIG. 5 shows a schematic top view of another embodiment of a device as claimed in the invention.

Especially in the beam shaping unit shown in FIG. 3 is it possible to form an array 32 of prisms 16, as is shown in FIG. 5. In FIG. 5 the cross-hatched surfaces 26, 27 which are shown in FIG. 3a are indicated. It is thus possible by means of the array 32 for example in an analogous structure to FIG. 3a to implement with a beam splitter and beam combination unit 1 made as a polarization cube and a mirror 15 a host of beam shaping units which are located next to one another and which can shape the light beams proceeding from the light sources located next to one another according to FIG. 3 to FIG. 4.

It is furthermore possible to use a prism 16 as a beam rotation unit, which can be used separately for light beams, this beam rotation unit being able to rotate a light beam by 90°. Compared to beam rotation units, which are known from the prior art the use of a prism 16 represents an exceptionally economical alternative.

In particular an array 32 of prisms 16 can be used as the beam rotation unit for the light beams which are located next to one another and which proceed from a laser diode bar. The light beams emerging from the array 32 of prisms 16 are offset in parallel relative to the original light beams and move out of the array 32 opposite the entry direction. This is clearly apparent in FIG. 5 in which for example the cross-hatched surfaces 26 can reproduce the cross section of the light beams which are moving out of the plane of the drawings in one direction, conversely the crosshatched areas 27 which correspond to the beams emerging from the array 32 reproduce the cross section of the beams which are moving into the plane of the drawing. It is apparent that in addition to the rotation of the cross section, offsetting of the light beams to the right and top in FIG. 5 has taken place. With the corresponding arrangement for example of a laser diode bar in front of the entry surfaces of the array 32 accordingly the light beams emerging from the array 32 could be guided for example away via the laser diode bar.

What is claimed is:

1. A device for shaping the cross section of a light beam, comprising at least one beam shaping unit with beam splitter means, beam deflection means and beam combining means, the beam splitter means being able to divide the light beam which is incident on the beam shaping unit into two component beams, the beam deflection means being able to deflect at least one of the component beams onto the beam combining means, and the beam combining means being able to combine the two component beams, such that the cross section of the light beam emerging from the beam shaping unit compared to the light beam entering the beam shaping unit is reduced in at least one direction (X), wherein the beam combining means is made as a polarization-selective beam splitter and beam combination unit which comprises at least two parts with a boundary surface which is located between them, and the two separated component beams are incident on the boundary surface from different directions, and depending on their linear polarization one of the component beams pass the boundary surface unhindered and the other of the component beams are reflected on the boundary surface so that the two component beams are combined in the area of the boundary surface and leave the beam splitter and beam combination unit essentially at the same location in the same direction, wherein the beam shaping unit comprises a polarization rotation element which can rotate the linear polarization of one of the two component beams, wherein the polarization rotation element is made as a prism which is arranged such that the cross section of the corresponding component beam is turned during passage through the prism, in this way the corresponding rotation of the linear polarization of this component beam taking place.

2. A device as claimed in claim 1, wherein the beam splitter and beam combination unit consists at least in sections of a double-refracting material.

3. A device as claimed in claim 1, wherein the beam splitter and beam combination unit is made as a Glan-Thompson prism.

4. A device as claimed in claim 1, wherein the beam splitter and beam combination unit is made as a polarization cube, the polarization cube consisting of two essentially identical prism-like parts which form a boundary surface along one diagonal surface of the cube with one another.

5. A device as claimed in claim 1, wherein at least one of the two prism-like parts is provided with a polarization-selective coating in the area of the boundary surface.

6. A device as claimed in claim 1, wherein the beam deflection means comprises a mirror which is located at an angle of 45° in the second of the two component beams.

7. A device as claimed in claim 1, wherein the beam deflection means comprises a prism in which the corresponding component beam is reflected.

8. A device as claimed in claim 1, wherein the device comprises more than one beam shaping unit which are located in succession such that the cross section of the light beam changes in each of the beam shaping units.

9. A device as claimed in claim 1, wherein the device comprises more than one beam shaping unit which are located next to one another such that light beams emerging from the light sources which are next to one another can be changed in the beam shaping units located next to one another.

10. An arrangement for coupling a light beam which proceeds from an elongated laser light source with an elongated cross section into an optical fiber, comprising a laser light source, at least one collimation unit for collimating the light beam which emerges from the laser light source, and at least one focusing unit for focusing the light beams onto an optical fiber, wherein the arrangement furthermore comprises a device which is located in the beam path of the light beam as claimed in claim 1.

11. A device for shaping the cross section of a light beam, comprising at least one beam shaping unit with beam splitter means, beam deflection means and beam combining means, the beam splitter means being able to divide the light beam which is incident on the beam shaping unit into two component beams, the beam deflection means being able to deflect at least one of the component beams onto the beam combining means, and the beam combining means being able to combine the two component beams, such that the cross section of the light beam emerging from the beam shaping unit compared to the light beam entering the beam shaping unit is reduced in at least one direction (X), wherein the beam combining means is made as a polarization-selective beam splitter and beam combination unit which comprises at least two parts with a boundary surface which is located between them, and the two separated component beams are incident on the boundary surface from different directions, and depending on their linear polarization one of the component beams pass the boundary surface unhindered and the other of the component beams are reflected on the boundary surface so that the two component beams are combined in the area of the boundary surface and leave the beam splitter and beam combination unit essentially at the same location in the same direction, wherein the beam deflection means comprises a prism in which the corresponding component beam is reflected, wherein prism is used at the same time as a polarization rotation element and as a deflection means.

12. A device as claimed in claim 11, wherein the prism, the mirror and the beam splitter and beam combination unit are arranged such that a component beam can be directly incident on the first entry surface of the beam splitter and beam combination unit, conversely the second component beam is reflected by the mirror into the prism, in which the beam cross section of the component beam is turned by 90° and from which the component beam can enter the second entry surface of the beam splitter and beam combination unit.

13. A device for shaping the cross section of a light beam, comprising at least one beam shaping unit with beam splitter means, beam deflection means and beam combining means, the beam splitter means being able to divide the light beam which is incident on the beam shaping unit into two component beams, the beam deflection means being able to deflect at least one of the component beams onto the beam combining means, and the beam combining means being able to combine the two component beams, such that the cross section of the light beam emerging from the beam shaping unit compared to the light beam entering the beam shaping unit is reduced in at least one direction (X), wherein the beam combining means is made as a polarization-selective beam splitter and beam combination unit which comprises at least two parts with a boundary surface which is located between them, and the two separated component beams are incident on the boundary surface from different directions, and depending on their linear polarization one of the component beams pass the boundary surface unhindered and the other of the component beams are reflected on the boundary surface so that the two component beams are combined in the area of the boundary surface and leave the beam splitter and beam combination unit essentially at the same location in the same direction, wherein the device comprises more than one beam shaping unit which are located next to one another such that light beams emerging from the light sources which are next to one another can be changed in the beam shaping units located next to one another, wherein the beam shaping units located next to one another comprise an array of prisms, each of the individual prisms of the array being used at the same time as a polarization rotation element and as a deflection means of each of the individual beam shaping units.

14. A beam rotation unit for a device comprising at least one beam shaping unit with beam splitter means, beam deflection means and beam combining means, the beam splitter means being able to divide the light beam which is incident on the beam shaping unit into two component beams, the beam deflection means being able to deflect at least one of the component beams onto the beam combining means, and the beam combining means being able to combine the two component beams, such that the cross section of the light beam emerging from the beam shaping unit compared to the light beam entering the beam shaping unit is reduced in at least one direction (X), wherein the beam combining means is made as a polarization-selective beam splitter and beam combination unit which comprises at least two parts with a boundary surface which is located between them, and the two separated component beams are incident on the boundary surface from different directions, and depending on their linear polarization one of the component beams pass the boundary surface unhindered and the other of the component beams are reflected, on the boundary surface so that the two component beams are combined in the area of the boundary surface and leave the beam splitter and beam combination unit essentially at the same location in the same direction, the beam rotation unit comprising at least one prism which can be located in the beam path of at least one light beam such that the cross section of the light beam passing through at least one prism can be turned by at least two reflections, wherein at least one prism has two base surfaces which are made as isosceles right triangles and three rectangular prism surfaces, and the light beam passing through at least one prism can be reflected on the two prism surfaces which extend between the legs of the base surfaces.

15. A beam rotation unit as claimed in claim 14, wherein the beam rotation unit comprises a number of prisms which are combined into an array so that the cross sections of the light beams proceeding from the light sources which are located next to one another can be rotated.

* * * * *